United States Patent
Chattopadhyaya (10) Patent No.: US 11,165,836 B2
(45) Date of Patent: Nov. 2, 2021

(54) REDUCING VOIP CALL DISRUPTION

(71) Applicant: International Business Machines Corporation, Armonk, NY (US)

(72) Inventor: Shayak Chattopadhyaya, Kolkata (IN)

(73) Assignee: International Business Machines Corporation, Armonk, NY (US)

(*) Notice: Subject to any disclaimer, the term of this patent is extended or adjusted under 35 U.S.C. 154(b) by 41 days.

(21) Appl. No.: 16/808,740

(22) Filed: Mar. 4, 2020

(65) Prior Publication Data

US 2021/0281617 A1    Sep. 9, 2021

(51) Int. Cl.
   *H04L 29/06* (2006.01)

(52) U.S. Cl.
   CPC ...... *H04L 65/1073* (2013.01); *H04L 65/1006* (2013.01); *H04L 65/1069* (2013.01)

(58) Field of Classification Search
   CPC .. H04L 65/10–65/1086; H04L 65/40–65/4023
   See application file for complete search history.

(56) References Cited

U.S. PATENT DOCUMENTS

| | | |
|---|---|---|
| 7,002,992 B1 | 2/2006 | Shaffer |
| 7,768,998 B1 | 8/2010 | Everson |
| 7,940,684 B2 | 5/2011 | Boyes |
| 9,462,123 B2 | 10/2016 | Ginde |
| 9,930,088 B1 | 3/2018 | Hodge |
| 10,341,406 B2 | 7/2019 | Fernández Gutiérrez |
| 10,356,592 B2 | 7/2019 | Takahashi |
| 2005/0060411 A1 | 3/2005 | Coulombe |
| 2005/0105464 A1 | 5/2005 | Acharya |
| 2012/0300769 A1 | 11/2012 | Narbutt |
| 2014/0101322 A1* | 4/2014 | Nissim .................. H04L 65/105 709/227 |
| 2016/0165058 A1 | 6/2016 | Vander Mey |
| 2017/0134357 A1* | 5/2017 | Ohlsson ................ H04L 67/146 |

FOREIGN PATENT DOCUMENTS

| | | |
|---|---|---|
| CN | 101069221 B | 5/2010 |
| WO | 2002093894 A2 | 11/2002 |

OTHER PUBLICATIONS

Camarillio et al., Grouping of Media Lines in the Session Description Protocol (SDP), Dec. 2002, The Internet Society, pp. 1-21 (Year: 2002).*

Rosenberg et al., An Offer/Answer Model with the Session Description Protocol (SDP), Jun. 2002, The Internet Society, pp. 1-25 (Year: 2002).*

* cited by examiner

*Primary Examiner* — Clayton R Williams
(74) *Attorney, Agent, or Firm* — Donald G. Weiss (57) ABSTRACT

In an approach to reducing VoIP call disruption, a current SDP is received from a first party. Whether the current SDP is an initial SDP is determined. Responsive to determining that the current SDP is not the initial SDP, whether the current SDP has a same origin as a previous SDP is determined. Responsive to determining that the current SDP has the same origin, whether the current SDP has a same media attribute as the previous SDP is determined. Responsive to determining that the current SDP has the same media attribute, whether the current SDP has a same order of one or more (a) line media attributes as the previous SDP is determined. Responsive to determining that the current SDP has the same order of one or more (a) line media attributes, the current SDP is prevented from being sent to a second party as a new offer.

20 Claims, 7 Drawing Sheets

```
            > Contact: <sip: 1.2.3.4:5678>
              Content-Length: 252
              Content-Type application/sdp
       Message Body
            > Session Description Protocol
              Session Description Protocol Version (v): 0
            > Owner/Creator, Session Id (o): caller in IP4 9.8.7.6
              Session Name (s): example
            > Connection Information (c): IN IP4 9.8.7.6
            > Time Description, active time (t): 0 0
 302a ─> Media Description, name and address (m): audio 27406 RTP/AVP 18 0 101
 304a ─> Media Attribute (a); rtpmap: 18 H264/90000
 306a ─> Media Attribute (a); rtpmap: 0 H263-1998/90000
 308a ─> Media Attribute (a); rtpmap: 101 telephone-event/8000
            > Media Attribute (a); ptime: 20
            > Media Attribute (a); fmtp: 18 0-16
            > Media Attribute (a); fmtp: 0 0-16
```

FIG. 3a

```
            > Contact: <sip: 1.2.3.4:5678>
              Content-Length: 252
              Content-Type application/sdp
       Message Body
            > Session Description Protocol
              Session Description Protocol Version (v): 0
            > Owner/Creator, Session Id (o): caller in IP4 9.8.7.6
              Session Name (s): example
            > Connection Information (c): IN IP4 9.8.7.6
            > Time Description, active time (t): 0 0
 302b ─> Media Description, name and address (m): audio 27406 RTP/AVP 18 0 101
 304b ─> Media Attribute (a); rtpmap: 18 H264/90000
 306b ─> Media Attribute (a); rtpmap: 0 H263-1998/90000
 310b ─> Media Attribute (a); ptime: 20
 312b ─> Media Attribute (a); fmtp: 18 0-16
 308b ─> Media Attribute (a); rtpmap: 101 telephone-event/8000
            > Media Attribute (a); fmtp: 0 0-16
```

REDUCING VOIP CALL DISRUPTION

BACKGROUND

The present invention relates generally to the field of network protocols for real-time communications, and more particularly to reducing Voice over Internet Protocol (VoIP) call disruption.

The terms Internet telephony, broadband telephony, and broadband phone service specifically refer to the provisioning of communications services (e.g., voice, fax, SMS, voice-messaging) over the Internet, rather than via the public switched telephone network (PSTN), also known as plain old telephone service (POTS).

VoIP is a technology that allows a user to make voice calls using a broadband connection instead of a regular, or analog, phone line. VoIP is a method and group of technologies for the delivery of voice communications and multimedia sessions over Internet Protocol (IP) networks, such as the Internet. VoIP services convert voice into a digital IP signal that travels over the Internet. If the call is to a regular telephone, the IP signal is converted to a regular telephone signal before it reaches the destination. VoIP allows a user to make a call directly from a computer, a special VoIP phone, or a traditional phone connected to a special adapter.

SUMMARY

Embodiments of the present invention disclose a method, a computer program product, and a system for reducing VoIP call disruption. In one embodiment, a current SDP is received from a first party. Whether the current SDP is an initial SDP is determined. Responsive to determining that the current SDP is not the initial SDP, whether the current SDP has a same origin as a previous SDP is determined. Responsive to determining that the current SDP has the same origin, whether the current SDP has a same media attribute as the previous SDP is determined. Responsive to determining that the current SDP has the same media attribute, whether the current SDP has a same order of one or more (a) line media attributes as the previous SDP is determined. Responsive to determining that the current SDP has the same order of one or more (a) line media attributes, the current SDP is prevented from being sent to a second party as a new offer.

DETAILED DESCRIPTION

VoIP is a method and group of technologies for the delivery of voice communications and multimedia sessions over IP networks, such as the Internet. The steps involved in originating VoIP telephone calls involve signaling, channel setup, digitization of the analog voice signals, and encoding. The digital information is packetized, and transmission occurs as IP packets over a packet-switched network. The transport media uses special media delivery protocols that encode audio and video with audio and video codecs. Various codecs exist that optimize the media stream based on application requirements and network bandwidth, and different VoIP sessions may use different codecs. To accommodate these different codecs, during the progress of a VoIP audio or video call, media attributes are exchanged to signal the attributes, including the chosen codec, that both ends of the connection expect during the call. The procedure to initiate the VoIP call is called the Session Initiation Protocol (SIP). SIP uses an offer/answer exchange model to establish and update VoIP sessions. SIP messages contain the session description in SDP messages and media attributes are exchanged within the SIP messages.

The media attributes can be modified anytime during the call, by any participant in the call offering new attributes. Determining if the media is changing is accomplished by correctly comparing the proposed media attributes to the current media attributes. Incorrect comparison may cause incorrect message passing via the Session Initiation Protocol (SIP) server, breaking the offer-exchange model down the line. This may result in premature call drops. The present invention correctly compares media attributes under all circumstances and eliminates the call disruption issues due to incorrect comparison of the media attributes.

SIP uses an offer/answer exchange model to establish and update VoIP sessions. SIP messages contain the session description which conforms to Session Description Protocol (SDP) and media attributes are exchanged within the SIP messages. The present invention identifies those SDP messages that contain the same attributes but that are different in structure. If two SDP messages are compared character by character and their structure is different, existing systems will infer that they are different messages and will update the media attributes of the call. That will cause a change in call flow, causing conflicting signaling messages which in some cases results in a call collision disrupting the call, a condition commonly known as glare. The present invention determines if two SDP messages are functionally the same even if they are structurally different, and therefore allows the call to proceed, avoiding the glare condition.

An example of a usage case for the present invention follows. In this example, person A picks up a VoIP device to call person B for an audio call. The VoIP device of person A proposes usage of either codec X or codec Y based on the call quality and bandwidth requirements. The VoIP device of person B starts ringing, and along with the ring, an SDP message is passed from the VoIP device of B notifying the VoIP device of person A that the VoIP device of person B can accept audio using either codec X or codec Y. Person B answers the call, and a response SDP is sent back to the VoIP device of person A. Ideally, the SDP sent by the VoIP device of person B while ringing and the SDP sent by the VoIP device of person B when the call is answered should be the same. Sometimes, however, the order of the attributes change. The same response is sent to the VoIP device of person A, although this time the structure of the SDP message has changed. The SIP server that is controlling the call establishment interprets the SDP message from the VoIP device of person B as a new SDP message. The SIP server therefore forwards the SDP message from the VoIP device of B to the VoIP device of person A for acceptance, and issues a new offer request with the new SDP. At the same time, person A decided to accept the call and confirmed acceptance of the earlier codec sent with the ringing response from the VoIP device of person B by sending a new invite to the SIP server. At this point, the SIP server is waiting for a response to the new invite sent to the VoIP device of person A, but instead it receives the new invite from the VoIP device of person B. The SIP server responds with an error code which indicates that the SIP server is waiting for a response (to the earlier SDP) and cannot receive a new request. This creates a glare condition and ultimately the call is disrupted.

If the SIP server instead understood that the VoIP device of person B was sending the same attribute functionally as before, although structurally different, it would have processed the request from the VoIP device of person A and the call would have continued without disruption.

Figure 1:
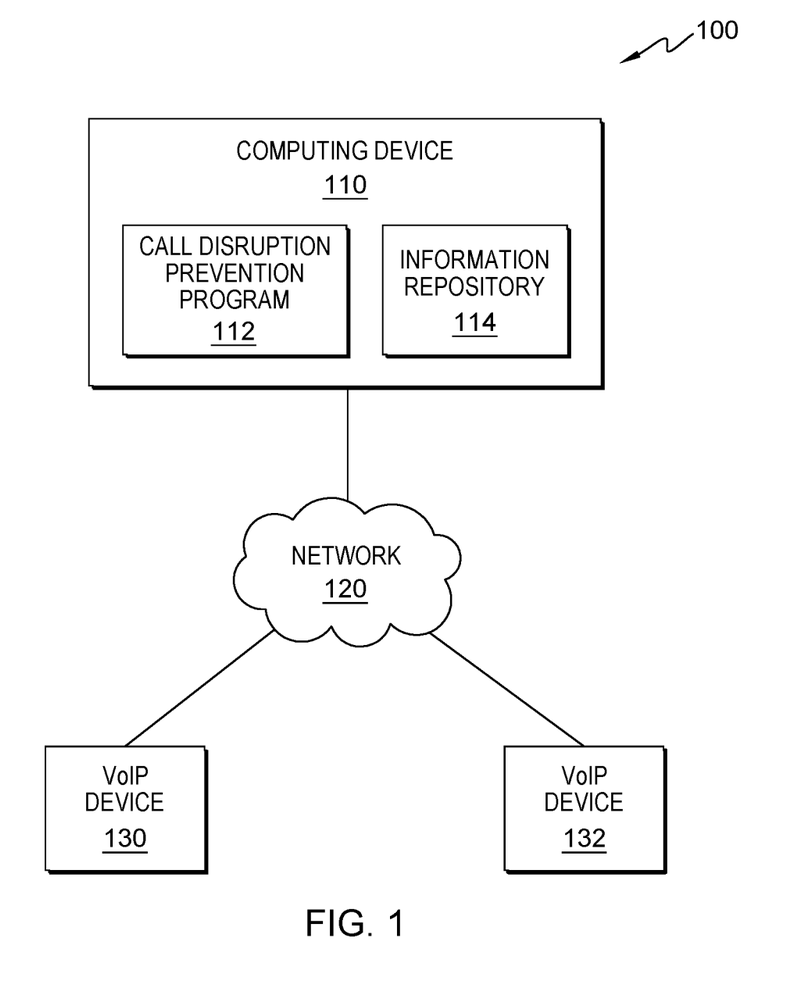
FIG. 1 is a functional block diagram illustrating a distributed data processing environment, in accordance with an embodiment of the present invention.

FIG. 1 is a functional block diagram illustrating a distributed data processing environment, generally designated 100, suitable for operation of call disruption prevention program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, and VoIP devices 130 and 132, all connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, VoIP devices 130 and 132, and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes call disruption prevention program 112. In an embodiment, call disruption prevention program 112 is a program, application, or subprogram of a larger program for reducing VoIP call disruption. In an alternative embodiment, call disruption prevention program 112 may be located on any other device accessible by computing device 110 via network 120.

In an embodiment, computing device 110 includes information repository 114. In an embodiment, information repository 114 may be managed by call disruption prevention program 112. In an alternate embodiment, information repository 114 may be managed by the operating system of the device, alone, or together with, call disruption prevention program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, SIP data, SDP message data, user data, system configuration data, and other data that is received by call disruption prevention program 112 from one or more sources, and data that is created by call disruption prevention program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

Distributed data processing environment 100 includes VoIP devices 130 and 132. In an embodiment, VoIP devices 130 and 132 are computing devices that are capable of VoIP communications and that connect to each other and to computing device 110 over network 120. In an embodiment, VoIP devices 130 and 132 may connect via a wired network connection. In another embodiment, VoIP devices 130 and 132 may connect via a wireless network connection. In yet another embodiment, VoIP devices 130 and 132 may connect via any method that is appropriate for connecting computing devices that are capable of VoIP communications as would be known to those skilled in the art.

In an embodiment, VoIP devices 130 and 132 may be smart phones, cellular phones, standalone computing devices, mobile computing devices, or any other electronic devices or computing systems capable of VoIP communications. In an embodiment, either VoIP device 130 or VoIP device 132 can be a laptop computer, a tablet computer, a netbook computer, a personal computer (PC), a desktop computer, a personal digital assistant (PDA), or any programmable electronic device capable of VoIP communications with other computing devices (not shown) within distributed data processing environment 100 via network 120. In another embodiment, either VoIP device 130 or VoIP device 132 can represent a server computing system utilizing multiple computers as a server system, such as in a cloud computing environment. In yet another embodiment, either VoIP device 130 or VoIP device 132 represent a computing system utilizing clustered computers and components (e.g., database server computers, application server computers) that act as a single pool of seamless resources when accessed within distributed data processing environment 100.

In some embodiments, VoIP devices 130 and 132 may be stand-alone devices. In other embodiments, VoIP devices 130 and 132 may be incorporated into other devices, for example, a personal computer or a laptop computer. In an embodiment, distributed data processing environment 100 may include any number of VoIP devices 130 and 132.

Figure 2A:
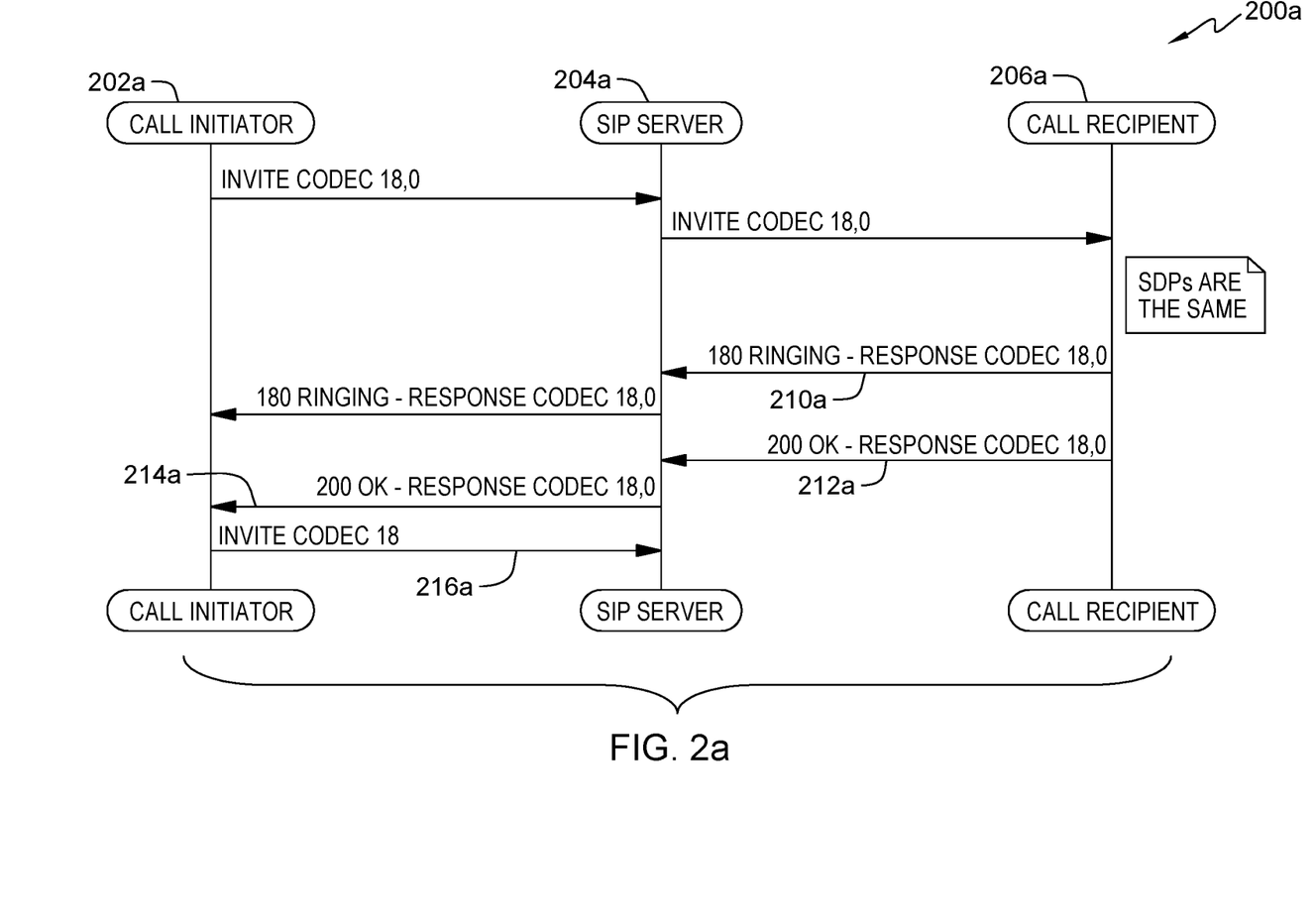
FIG. 2*a* illustrates an example of the message flow for a valid call using a standard SIP server.
Figure 2B:
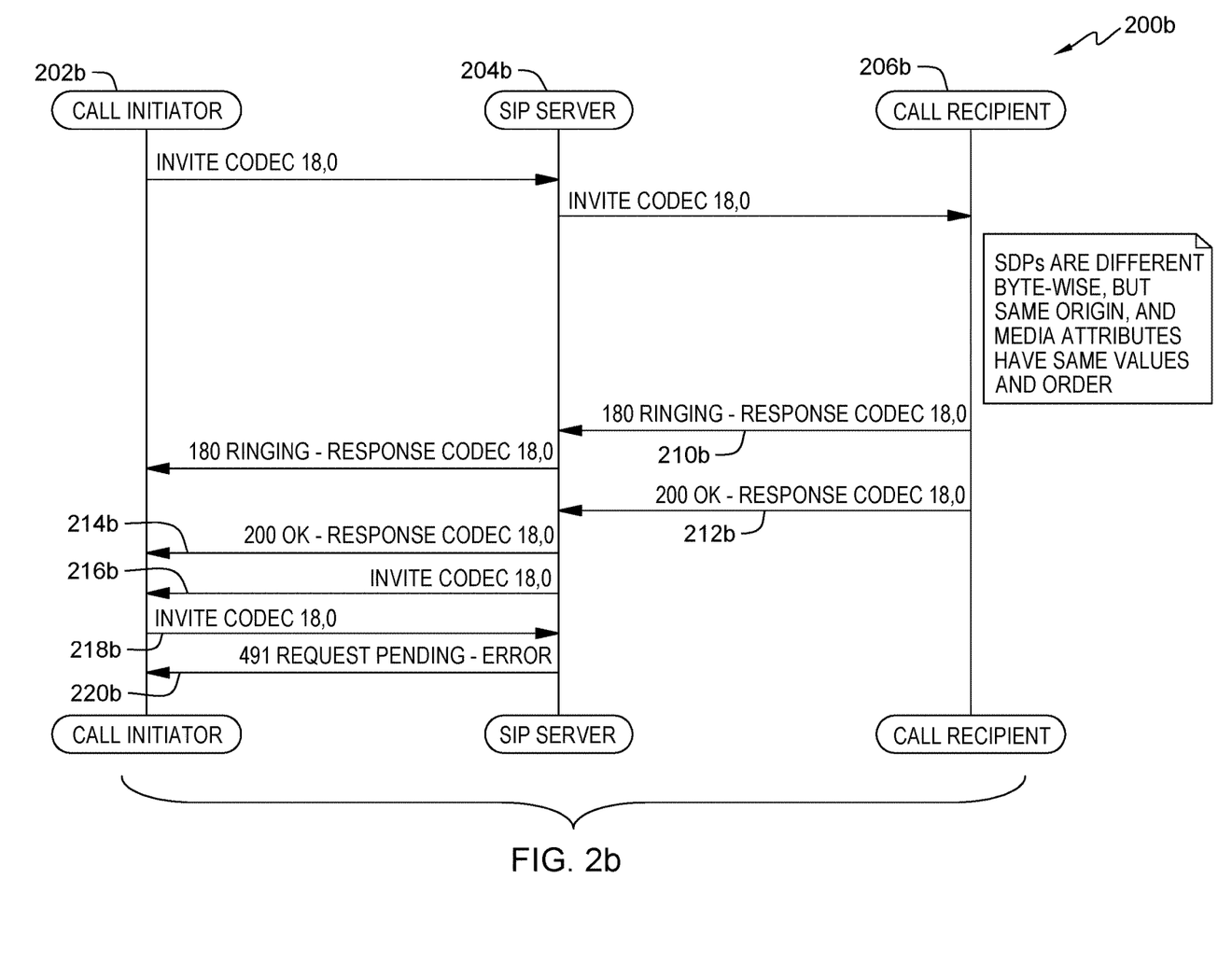
FIG. 2*b* illustrates an example of the message flow with conflicting signaling messages resulting in a glare condition using a standard SIP server.
Figure 2C:
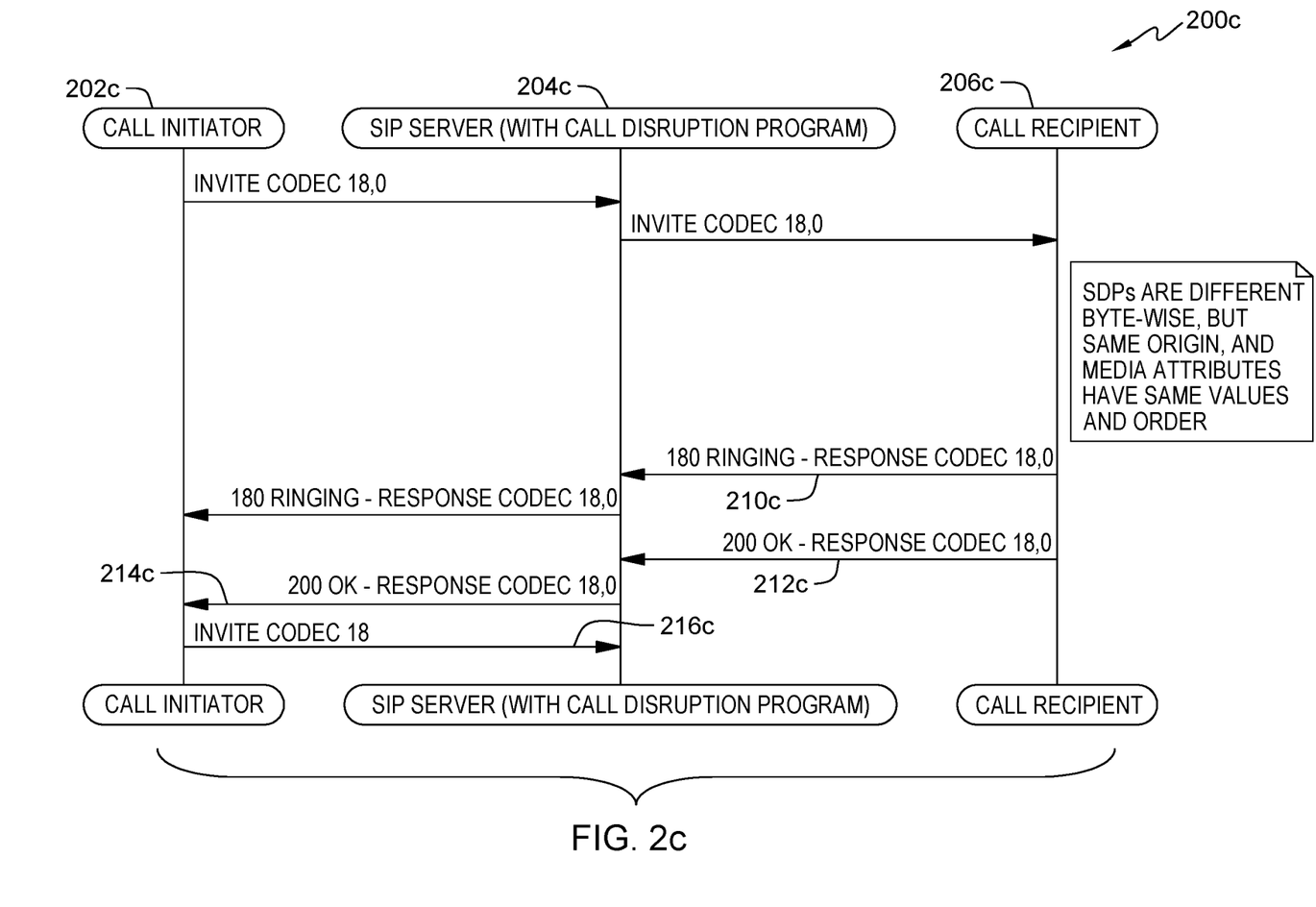
FIG. 2*c* illustrates an example of the message flow with conflicting signaling messages as in FIG. 2*b*, but with the call disruption prevention program on the SIP server, in accordance with an embodiment of the present invention.

FIGS. 2a and 2b are examples of standard SIP messaging sequences for initiating a VoIP call, using a standard SIP server in place of call disruption prevention program 112. FIG. 2c is an example of SIP messaging sequences for initiating a VoIP call, using a standard SIP server incorporating call disruption prevention program 112.

FIG. 2a is an example of the message flow for a valid call, generally designated 200a. Message flow 200a includes call initiator 202a, SIP server 204a and call recipient 206a. In step 210a, call recipient 206a has responded to the standard SIP INVITE message with a 180-ringing response that contains codecs 18 and 0. In step 212a, call recipient 206a has responded with the standard SIP 200-OK message with the same SDP as the 180-ringing message, including the same codecs 18 and 0. In step 214a, since the SDP in the 200-OK message is the same as in the 180-ringing message, SIP server 204a passes the 200-OK message off to call initiator 202a. In step 216a, call initiator 202a verifies that the SDP is the same as the previous message, and therefore sends a final INVITE message reflecting the final codec choice, in this case codec 18, and the call proceeds.

FIG. 2b is an example of the message flow with conflicting signaling messages resulting in a glare condition. Message flow 200b includes call initiator 202b, SIP server 204b, and call recipient 206b. In step 210b, call recipient 206b has responded to the standard SIP INVITE message with a 180-ringing response that contains codecs 18 and 0. In step 212b, when call recipient 206b has answered the call, a 200-OK message is sent as in FIG. 2a, but with an SDP having the same origin and media attributes, but which are different byte-wise (i.e., the media attributes are the same, but the order is different). In this case, the SDP in the response is functionally the same as the SDP in the original INVITE, but it is not exactly the same byte-wise (see the description of FIG. 3b below for an example of two SDPs that are functionally identical, but byte-wise different). In step 214b, since the byte order of the SDP is different from the 180-ringing message, SIP server 204b considers this a different SDP and passes the 200-OK message off to call initiator 202b in step 216b. But in step 216b, since SIP server 204b thinks this is a new SDP, SIP server 204b creates a new INVITE message on its own and makes a new offer with that SDP to call initiator 202b. In step 218b, since call initiator 202b was not expecting the INVITE message in step 216b, a race condition ensues, and call initiator 202b sends an INVITE message with codecs 18 and 0. In step 220b, SIP server 204b, upon receiving that invite, sends an 491-request pending error response to call initiator 202b because SIP server 204b has not received a response back for the INVITE message sent earlier in step 216b. Because of this error, the call does not proceed further, creating a glare condition.

FIG. 2c is the same example of the message flow with conflicting signaling messages as in FIG. 2b, but in this example, call disruption prevention program 112 controls the SIP server. Message flow 200c includes call initiator 202c, SIP server 204c, and call recipient 206c. In this example, SIP server 204c includes call disruption prevention program 112. In step 210c, call recipient 206c has responded to the standard SIP INVITE message with a 180-ringing response that contains codecs 18 and 0, but with an SDP having the same origin and media attributes, but which are different byte-wise (i.e., the media attributes are the same, but the order is different). In this case, the SDP in the response is functionally the same as the SDP in the original INVITE, but it is not exactly the same byte-wise (see the description of FIG. 3b below for an example of two SDPs that are functionally identical, but byte-wise different). In step 212c, call recipient 206c has forwarded the 200-OK message as in FIG. 2a. In step 214c, since the byte order of the SDP is different from the 180-ringing message, SIP server 204c with call disruption prevention program 112 compares the media attributes of the two SDP messages, and determines that they are functionally the same. Therefore, unlike the example in FIG. 2b, SIP server 204c does not create a new INVITE message. In step 216a, call initiator 202a verifies that the SDP is the same as the previous message, and therefore sends a final INVITE message reflecting the final codec choice, in this case codec 18, and the call proceeds.

Figure 3A:
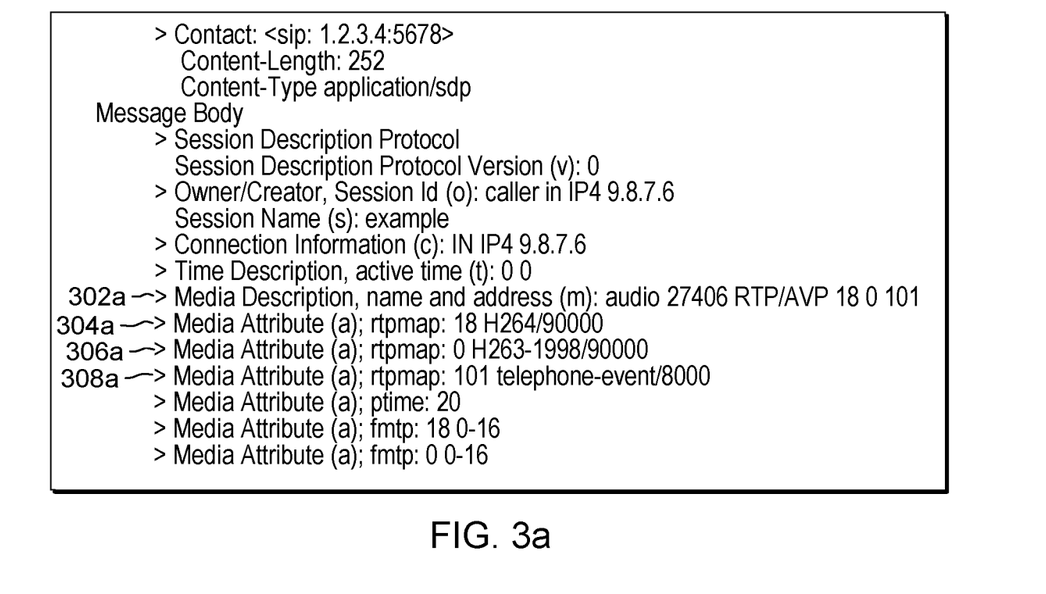
FIGS. 3*a* and 3*b* are examples of standard Session Description Protocol (SDP) messages for initiating a VoIP call, in accordance with an embodiment of the present invention.
Figure 3B:
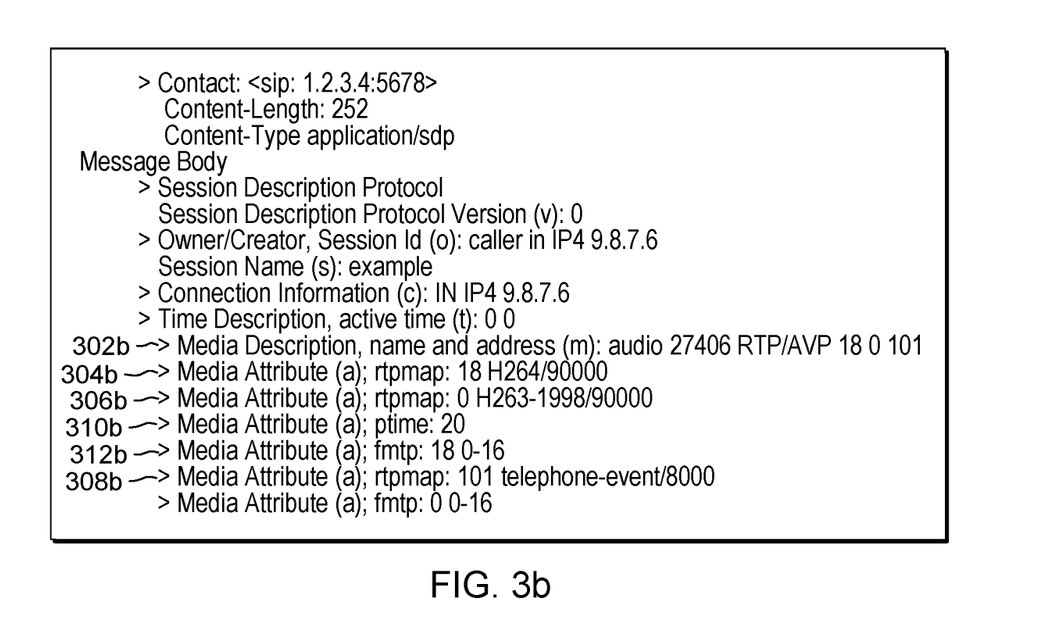

FIGS. 3a and 3b are examples of standard SDP messages for initiating a VoIP call. FIG. 3a is the SDP from one end of the connection, while FIG. 3b is the SDP from the other end of the connection. In FIG. 3a, the SDP message body contains codec descriptions in steps 302a-308a. Step 302a is the media description, name and address (m) line, also called the (m) line media attribute, which lists the codecs being offered by the sender of the SDP. In this example, the sender of the SDP is offering audio codecs 18, 0, and 101. Steps 304a, 306a, and 308a are the real-time protocol audio video (rtpmap) profiles for codecs 18, 0, and 101, respectively. In FIG. 3b, the response SDP message body contains the same media description, name and address (m) line, with the same codecs, in step 302b as in step 302a in FIG. 3a. Steps 304b and 306b are the rtpmap profiles for codecs 18 and 0, respectively, again as in FIG. 3a. In this example, however, the rtpmap profile for codec 101 does not immediately follow step 306b. Here, rtpmap step 308b is preceded by two additional media attribute (a) lines, step 310b (a ptime profile) and step 312b (an fmtp profile). In this example, a standard SIP server would issue a new INVITE signal, as shown in step 218b of FIG. 2b, because it would consider these different SDP messages. This would result in a race condition as illustrated in FIG. 2b, possibly resulting in a glare condition and dropped call.

In the present invention, however, call disruption prevention program 112 recognizes that the order of the media attributes in steps 304b, 306b, and 308b in FIG. 3b is the same as in steps 304a, 306a, and 308a of FIG. 3a, regardless of the intervening ptime and fmtp profiles, and that the SDP is from the same origin. Call disruption prevention program 112 therefore determines that the SDP in FIG. 3b is functionally the same as the SDP in FIG. 3a, and does not issue the new INVITE signal as shown in step 218*b* of FIG. 2*b*, preventing the glare condition. The call continues uninterrupted.

Figure 4:
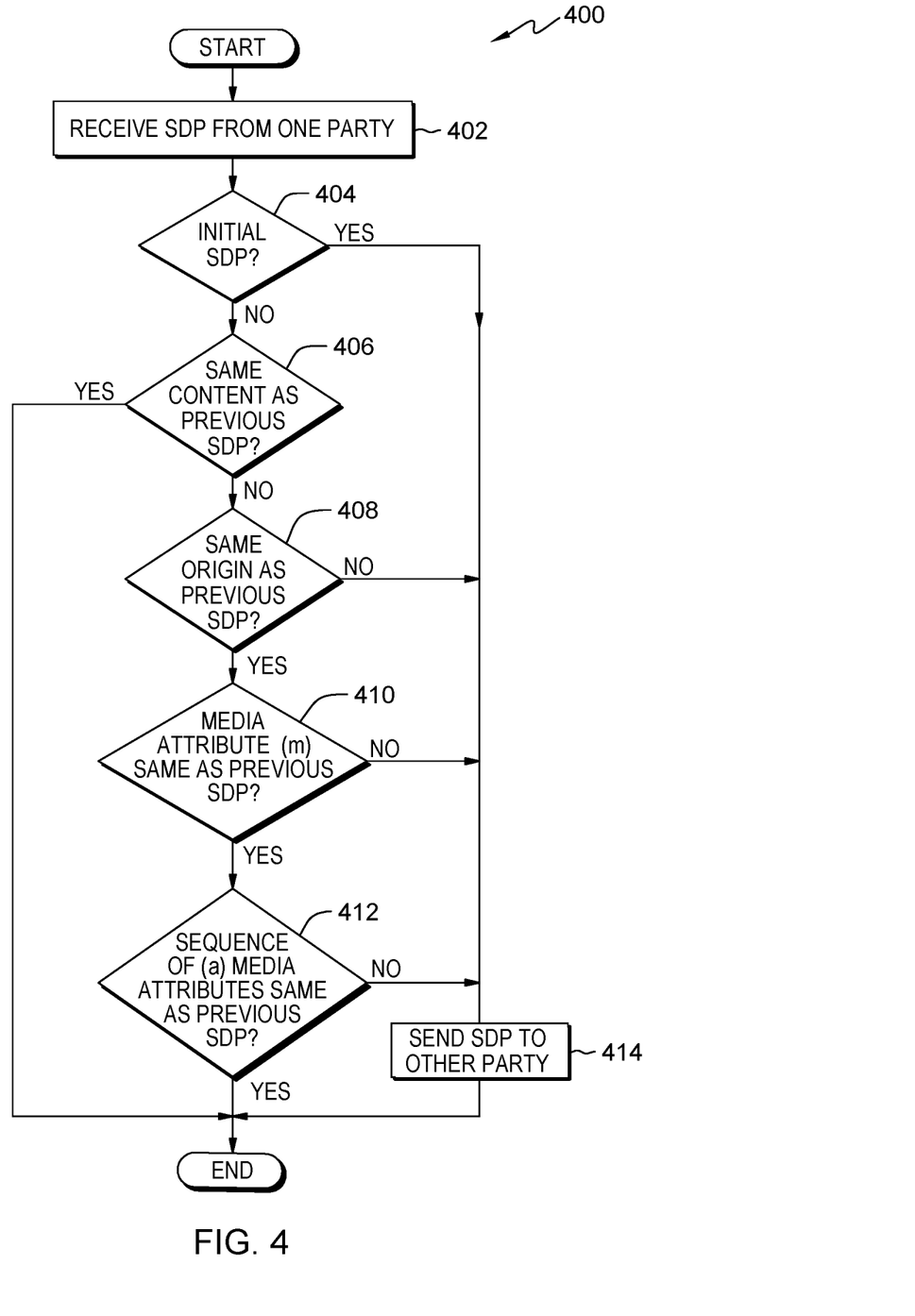
FIG. 4 is a flowchart depicting operational steps of the call disruption prevention program, on a computing device within the distributed data processing environment of FIG. 1, for reducing VoIP call disruption, in accordance with an embodiment of the present invention.

FIG. 4 is a flow chart diagram of workflow 400 depicting operational steps for call disruption prevention program 112 for reducing VoIP call disruption. In an alternative embodiment, the steps of workflow 400 may be performed by any other program while working with call disruption prevention program 112. In an embodiment, call disruption prevention program 112 receive an SDP from one party. In an embodiment, call disruption prevention program 112 determines if the received SDP is the initial SDP. In an embodiment, if the received SDP is not the initial SDP, then call disruption prevention program 112 determines if the received SDP has the same content as the previous SDP. In an embodiment, if the received SDP does not have the same content as the previous SDP, then call disruption prevention program 112 determines if the received SDP has the same origin as the previous SDP. In an embodiment, if the received SDP has the same origin as the previous SDP, then call disruption prevention program 112 determines if the (m) line media attribute is the same as in the previous SDP. In an embodiment, if the (m) line media attribute is the same as in the previous SDP, then call disruption prevention program 112 determines if the order of (a) line media attributes is the same as in the previous SDP. In an embodiment, if the order of (a) line media attributes is not the same as in the previous SDP, then call disruption prevention program 112 makes a new offer with the SDP to the other party.

It should also be appreciated that embodiments of the present invention provide at least for reducing VoIP call disruption. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

Call disruption prevention program 112 receive an SDP from one party (step 402). In an embodiment, call disruption prevention program 112 receives an SDP from one party during the SIP sequence to initiate a VoIP call.

Call disruption prevention program 112 determines if the received SDP is the initial SDP (decision block 404). In an embodiment, if call disruption prevention program 112 determines that this is the initial SDP for the VoIP call ("yes" branch, decision block 404), then there is no further analysis required, and the SDP must be forwarded to the other party. Therefore, call disruption prevention program 112 proceeds to step 414. If call disruption prevention program 112 determines that this is not the initial SDP for the VoIP call ("no" branch, decision block 404), then the SDP requires further analysis, so call disruption prevention program 112 proceeds to decision block 406.

Call disruption prevention program 112 determines if the received SDP has the same content as the previous SDP (decision block 406). In an embodiment, if call disruption prevention program 112 determines that the received SDP has the same content as the previous SDP ("yes" branch, decision block 406), then there is no further action required, and call disruption prevention program 112 ends for this sequence. The call proceeds uninterrupted. If call disruption prevention program 112 determines that the received SDP does not have the same content as the previous SDP ("no" branch, decision block 406), then the SDP requires further analysis, so call disruption prevention program 112 proceeds to decision block 408.

Call disruption prevention program 112 determines if the received SDP has the same origin as the previous SDP (decision block 408). In an embodiment, if call disruption prevention program 112 determines that the received SDP does not have the same origin as the previous SDP ("no" branch, decision block 408), then then the SDP must be forwarded to the other party, so call disruption prevention program 112 proceeds to step 414. If call disruption prevention program 112 determines that the received SDP has the same origin as the previous SDP ("yes" branch, decision block 408), then the SDP requires further analysis, so call disruption prevention program 112 proceeds to decision block 410.

Call disruption prevention program 112 determines if the (m) line media attribute is the same as in the previous SDP (decision block 410). In an embodiment, if call disruption prevention program 112 determines that the (m) line media attribute in the received SDP is not the same as in the previous SDP ("no" branch, decision block 410), then then the SDP is functionally different from the previous SDP. Therefore, the SDP must be forwarded to the other party, so call disruption prevention program 112 proceeds to step 414. If call disruption prevention program 112 determines that the (m) line media attribute in the received SDP is the same as in the previous SDP ("yes" branch, decision block 410), then the SDP requires further analysis, so call disruption prevention program 112 proceeds to decision block 412.

Call disruption prevention program 112 determines if the order of (a) line media attributes is the same as in the previous SDP (decision block 412). In an embodiment, if call disruption prevention program 112 determines that the order of (a) line media attributes is not the same as in the previous SDP ("no" branch, decision block 412), then the SDP is functionally different from the previous SDP. Therefore, the SDP must be forwarded to the other party, so call disruption prevention program 112 proceeds to step 414. If call disruption prevention program 112 determines that the order of (a) line media attributes is the same as in the previous SDP ("yes" branch, decision block 412), then there is no further action required, and call disruption prevention program 112 ends for this sequence.

Call disruption prevention program 112 sends the SDP to the other party (step 414). In an embodiment, call disruption prevention program 112 has determined that the SDP is not the same, either structurally or functionally, and therefore call disruption prevention program 112 makes a new offer with the SDP to the other party to the VoIP call.

It should be appreciated that the process depicted in FIG. 4 illustrates one possible iteration of call disruption prevention program 112, which repeats for each SDP received by call disruption prevention program 112.

Figure 5:
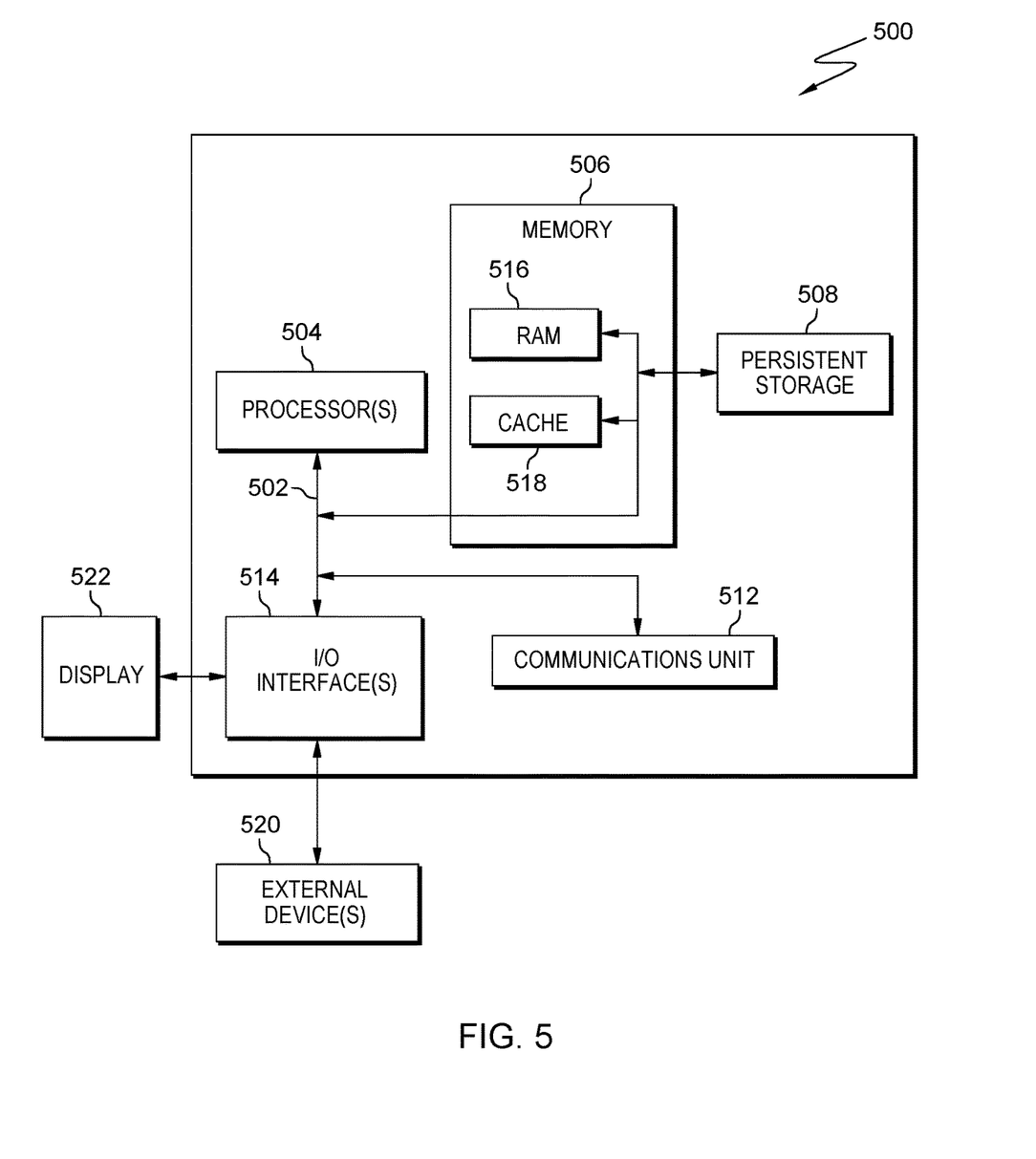
FIG. 5 depicts a block diagram of components of the computing devices executing the call disruption prevention program within the distributed data processing environment of FIG. 1, in accordance with an embodiment of the present invention.

FIG. 5 is a block diagram depicting components of computing device 110 suitable for call disruption prevention program 112, in accordance with at least one embodiment of the invention. FIG. 5 displays the computer 500, one or more processor(s) 504 (including one or more computer processors), a communications fabric 502, a memory 506 including, a random-access memory (RAM) 516, and a cache 518, a persistent storage 508, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and input/output (I/O) interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for call disruption prevention program 112 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. In the context of some embodiments of the present invention, the source of the various input data may be physically remote to the computer 500 such that the input data may be received, and the output similarly transmitted via the communications unit 512.

The I/O interface(s) 514 allows for input and output of data with other devices that may be connected to computer 500. For example, the I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present invention, e.g., call disruption prevention program 112, can be stored on such portable computer readable storage media and can be loaded onto persistent storage 508 via the I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for reducing Voice over Internet Protocol (VoIP) call disruption, the computer-implemented method comprising:
    receiving, by one or more computer processors, a current Session Description Protocol (SDP) message from a first party;
    determining, by the one or more computer processors, if the current SDP is an initial SDP for a call;
    responsive to determining that the current SDP is not the initial SDP for the call, determining, by the one or more computer processors, if the current SDP has a same origin as a previous SDP;
    responsive to determining that the current SDP has the same origin as the previous SDP, determining, by the one or more computer processors, if the current SDP has a same (m) line media attribute as the previous SDP;
    responsive to determining that the current SDP has the same (m) line media attribute as the previous SDP, determining, by the one or more computer processors, if the current SDP has a same order of one or more (a) line media attributes as the previous SDP; and
    responsive to determining that the current SDP has the same order of one or more (a) line media attributes as the previous SDP, preventing, by the one or more computer processors, the current SDP from being sent to a second party as a new offer.

2. The computer-implemented method of claim 1 further comprising, responsive to determining that the current SDP is the initial SDP for the call, sending, by the one or more computer processors, the current SDP to the second party.

3. The computer-implemented method of claim 1 further comprising, responsive to determining that the current SDP does not have the same origin as the previous SDP, sending, by the one or more computer processors, the current SDP to the second party.

4. The computer-implemented method of claim 1 further comprising, responsive to determining that the current SDP does not have the same (m) line media attribute as the previous SDP, sending, by the one or more computer processors, the current SDP to the second party.

5. The computer-implemented method of claim 1 further comprising, responsive to determining that the current SDP does not have the same order of one or more (a) line media attributes as the previous SDP, sending, by the one or more computer processors, the current SDP to the second party.

6. The computer-implemented method of claim 1, wherein the call is an audio call.

7. The computer-implemented method of claim 1, wherein the call is a video call.

8. A computer program product for reducing Voice over Internet Protocol (VoIP) call disruption, the computer program product comprising one or more computer readable storage media and program instructions stored on the one or more computer readable storage media, the program instructions including instructions to:
  receive a current Session Description Protocol (SDP) message from a first party;
  determine if the current SDP is an initial SDP for a call;
  responsive to determining that the current SDP is not the initial SDP for the call, determine if the current SDP has a same origin as a previous SDP;
  responsive to determining that the current SDP has the same origin as the previous SDP, determine if the current SDP has a same (m) line media attribute as the previous SDP;
  responsive to determining that the current SDP has the same (m) line media attribute as the previous SDP, determine if the current SDP has a same order of one or more (a) line media attributes as the previous SDP; and
  responsive to determining that the current SDP has the same order of one or more (a) line media attributes as the previous SDP, prevent the current SDP from being sent to a second party as a new offer.

9. The computer program product of claim 8 further comprising, responsive to determining that the current SDP is the initial SDP for the call, send the current SDP to the second party.

10. The computer program product of claim 8 further comprising, responsive to determining that the current SDP does not have the same origin as the previous SDP, send the current SDP to the second party.

11. The computer program product of claim 8 further comprising, responsive to determining that the current SDP does not have the same (m) line media attribute as the previous SDP, send the current SDP to the second party.

12. The computer program product of claim 8 further comprising, responsive to determining that the current SDP does not have the same order of one or more (a) line media attributes as the previous SDP, send the current SDP to the second party.

13. The computer program product of claim 8, wherein the call is an audio call.

14. The computer program product of claim 8, wherein the call is a video call.

15. A computer system for reducing Voice over Internet Protocol (VoIP) call disruption, the computer system comprising:
  one or more computer processors;
  one or more computer readable storage media; and
  program instructions stored on the one or more computer readable storage media for execution by at least one of the one or more computer processors, the stored program instructions including instructions to:
  receive a current Session Description Protocol (SDP) message from a first party;
  determine if the current SDP is an initial SDP for a call;
  responsive to determining that the current SDP is not the initial SDP for the call, determine if the current SDP has a same origin as a previous SDP;
  responsive to determining that the current SDP has the same origin as the previous SDP, determine if the current SDP has a same (m) line media attribute as the previous SDP;
  responsive to determining that the current SDP has the same (m) line media attribute as the previous SDP, determine if the current SDP has a same order of one or more (a) line media attributes as the previous SDP; and
  responsive to determining that the current SDP has the same order of one or more (a) line media attributes as the previous SDP, prevent the current SDP from being sent to a second party as a new offer.

16. The computer system of claim 15 further comprising, responsive to determining that the current SDP is the initial SDP for the call, send the current SDP to the second party.

17. The computer system of claim 15 further comprising, responsive to determining that the current SDP does not have the same origin as the previous SDP, send the current SDP to the second party.

18. The computer system of claim 15 further comprising, responsive to determining that the current SDP does not have the same (m) line media attribute as the previous SDP, send the current SDP to the second party.

19. The computer system of claim 15 further comprising, responsive to determining that the current SDP does not have the same order of one or more (a) line media attributes as the previous SDP, send the current SDP to the second party.

20. The computer system of claim 15, wherein the call is an audio call.

* * * * *